Patented Sept. 23, 1941

2,256,612

UNITED STATES PATENT OFFICE 2,256,612

MANUFACTURE OF MIXED PHENOL ETHERS AND ALKYLATED PHENOLS

Carleton Ellis, Montclair, N. J., assignor to Standard Oil Development Company, a corporation of Delaware No Drawing. Application June 29, 1939, Serial No. 281,804

9 Claims. (Cl. 260—612)

This invention relates to preparation of ethers and more particularly to those ethers which contain both a cyclic and an acyclic radical in the molecule. It also involves the simultaneous production of alkylated phenols during the synthesis of such ethers.

The customary procedure for preparing ethers of the aromatic-aliphatic type (i. e. those having a cyclic and an acyclic radical in the molecule) comprises heating an alkali metal salt of the phenolic body with an alkyl halide, e. g. ethyl chloride. In other instances a dialkyl sulphate, such as diethyl sulphate, may be employed in like manner as the alkylating agent. The disadvantage connected with using methods of this type is that a relatively high temperature is necessary to secure interaction between the alkali metal phenolate and alkyl halide or dialkyl sulphate. As a consequence the alkali metal phenolate may serve to eliminate hydrogen halide from the alkyl halide, thus giving rise to an acyclic olefin and free or uncombined phenol material. When the alkyl halide, for example, propyl chloride, possesses a low boiling point, there is always the troublesome problem of preventing loss or leakage of the volatile reactant from the reaction vessel. If a dialkyl sulphate is the alkylating agent, the employment of heat may result in at least partial decomposition of the sulphate, thus resulting in a reduced yield of ether or contamination of the latter with impurities which very often are removed or eliminated only with considerable difficulty.

One object of this invention is to provide a method whereby interaction may be effected between phenolic bodies and an alkyl halide or a dialkyl sulphate without the application of external heat. Another object is to secure interaction at substantially atmospheric temperature in the presence of a solvent, thereby obtaining at least partial separation of the resulting ether from other products of the reaction. Still another object of this invention is the preparation of alkyl-aromatic ethers in the presence of an excess of mild alkali so that the reaction mixture will not contain any appreciable proportion of acidic bodies (carboxylic or mineral). The presence of such acidic material is particularly objectionable when ethers are prepared which contain a secondary or tertiary aliphatic group, since under such conditions the ether (e. g. phenyl-sec-butyl ether) is prone to arrange to the corresponding alkylated phenol (o-and/or p-sec-butyl phenol).

The preferred conditions for preparing ethers according to this invention are interaction of the heavy metal salts of phenolic bodies with alkyl halides or dialkyl sulphates in the presence of a solvent. During reaction the mixture is kept vigorously agitated and no external heat is applied. As solvents are preferred those liquids which do not interact with the substances giving rise to ethers or which do not exert any deleterious effect on the course of the reaction. Examples of liquids which are particularly suitable are the lower aromatics, e. g. benzol or toluol, and hydrocarbons such as gasoline (either that obtained directly from the distillation of crude petroleum or by pyrolysis of any of the various fractions of petroleum), petroleum ether, and the like. Preferably refined petroleum distillates should be employed, that is, those liquid hydrocarbons which are substantially free of impurities which may exert any harmful or undesirable effect on the course of the reaction between the phenolates and dialkyl sulphates or alkyl halides. In some instances oxygenated hydrocarbons, e. g. alcohols, may furnish a suitable medium for the synthesis of aromatic-aliphatic ethers.

The heavy metals suitable for this invention include zinc, mercury, lead, and the like, or more particularly those heavy metals whose oxides are sufficiently basic in character to unite with the phenolic bodies at hand to furnish metal phenolates. Furthermore, the latter should exhibit an appreciable solubility in the solvent employed as the liquid medium in which the synthesis of ethers is effected. The alkali and alkaline earth metals are excluded. The heavy metals applicable to this invention may be characterized also as those which yield sulphides insoluble in water and are not readily hydrolyzed by that liquid, particularly at room temperature.

Phenolic bodies which may be employed as one of the reactants in the methods herein disclosed comprise not only phenol (or carbolic acid), but also cresols and naphthols, or, in other words, those hydroxy compounds which contain a hydroxyl radical attached to an aromatic nucleus. It should be noted that phenolic bodies having side chains, such as cresols, are not precluded. Neither should this invention be limited to those compounds having side chains consisting only of methyl groups or radicals. In fact, one type of cresolic bodies suitable for the preparation of ethers are those extracted from petroleum distillates. For example, washing an appropriate kerosene distillate with aqueous caustic soda and afterwards acidifying the latter with a mineral acid (e. g. hydrochloric or sulphuric) furnishes a water-insoluble liquid containing a substantial proportion of cresolic bodies. If desired, the latter, after separation from the aqueous medium, may be subjected to fractional distillation thereby effecting substantial elimination of such impurities as sulphur compounds, hydrocarbons, and the like.

One procedure whereby ethers are prepared according to this invention comprises adding the phenolic body and a dialkyl sulphate to the liquid solvent and while the mixture is being stirred the metal oxide is incorporated. After reaction is completed, any insoluble material is separated by filtration, and the filtrate washed with aqueous alkali (to eliminate unreacted phenolic material) and then subjected to fractional distillation to secure the ether. The last operation may be carried out under atmospheric or sub-atmospheric pressure. Which condition is the more suitable will be determined, of course, by the boiling point of the desired ether. The higher the boiling point, the lower should be the pressure during distillation, thus preventing undesirable decomposition.

As a modification of the above procedure, the filtrate, after being washed with aqueous alkali, may be steam distilled in the presence of alkali. This latter operation is advantageous when the solvent is a liquid having a low boiling point, since the latter thereby is separated easily from the higher-boiling ether and simultaneously any dialkyl sulphate dissolved in the mixture of ether and solvent may be hydrolyzed by the alkali. The removal of dialkyl sulphates from the ethers is especially important as many of the sulphates appear to undergo decomposition during storage and as a consequence, if admixed in any appreciable proportion with the ethers, will cause the latter to become discolored.

Still another modification of the preparation of aromatic-aliphatic ethers comprises admixing the phenolic body and solvent and incorporating the metal oxide. While the resulting mixture is kept thoroughly agitated (without application of heat) the alkyl halide or dialkyl sulphate is added slowly. When interaction is complete, the reaction mixture may be worked up as described previously.

Procedures, according to this invention, are especially adapted to the preparation of ethers containing a secondary or tertiary aliphatic or acyclic group and an aromatic nucleus. However, it has been noted that, during the purification and/or isolation of such ethers by fractional distillation of the crude reaction product, a considerable proportion of high-boiling residue is obtained. Such a residue often exhibits properties which are characteristic of phenols (e. g. solubility in aqueous solutions of alkalies) and appears to be alkylated phenols which are either isomeric with the ether being synthesized or are derived from it. For example, treatment of phenol with diisopropyl sulphate, according to this invention, may yield not only the ether (isopropyl phenyl ether), but also as a distillation residue isopropyl phenol or diisopropyl phenol. The securing of such alkylated phenols as a by-product of the interaction of phenolic bodies and alkyl halides or dialkyl sulphates forms, therefore, a part of this invention.

Phenolic ethers of the types included in this invention are useful not only as antiseptics and germicides, but also because of their aromatic odor, as perfuming agents or perfume bases. One application of the latter is in the manufacture of toilet soaps. As these ethers, for the most part, possess high boiling points, their loss by evaporation should be small when detergent compositions containing them are exposed to the atmosphere or more particularly when wrapped and stored out of contact with air. Furthermore, the ethers appear to be considerably resistant to alkalies and therefore should not be effected by long contact with such mildly alkaline materials as toilet soaps. However, the application of such ethers should not be limited merely to imparting pleasant and agreeable odors to soaps since they may be used in many types of perfumes, either as the principal odoriferous agent or as a blending agent or perfume fixative.

The following examples will serve to illustrate this invention:

*Example 1*

47 parts of phenol (carbolic acid) and 100 parts of diisopropyl sulphate were dissolved in 55 parts of isopropyl alcohol. While the solution was being stirred and maintained at a temperature of 18° to 20° C., 111 parts of lead oxide were added in small portions. Stirring was continued for 5 hours. At the end of this period, the liquid mixture was freed of all insoluble material by filtration, and to the filtrate was added twice its volume of water and 60 volumes of aqueous caustic soda (35%). This resulted in the separation of an orange colored, water-insoluble liquid layer. The whole liquid mass, however, was subjected to steam distillation until substantially all of the oily material was recovered in the distillate as a light green liquid. The latter was separated, dried over sodium sulphate, and subjected to fractional distillation to remove any entrained water and/or isopropyl alcohol. The distillation residue was then washed well with water, dried and again subjected to distillation. The isopropyl phenyl ether fraction was taken as that boiling between 175° and 178° C.

*Example 2*

To 100 parts of a gasoline fraction boiling between 70° and 130° C. (and secured by fractional distillation of a cracked distillate) were added 47 parts of phenol (carbolic acid) and afterwards lead oxide, 111 parts, was incorporated into the mixture. The latter was allowed to stand, with occasional shaking, for 3 hours. At the end of this period all the phenol apparently had dissolved completely, but some undissolved lead oxide remained in the reaction flask. Isopropyl chloride, 42 parts, was added to the mixture and the whole stirred for 5 hours at 18° to 20° C. Afterwards all insoluble material was removed by filtration, and the filtrate made just alkaline with caustic soda and then just acid with hydrochloric acid. A water-insoluble layer separated and this was removed and subjected to distillation taking over all material boiling up to 130° C. The distillation residue was washed with 15% aqueous caustic soda and the insoluble portion extracted with benzene. The benzene solution was washed several times with water, then with dilute aqueous caustic soda, and afterwards dried and the benzene removed by distillation. The isopropyl phenyl ether in this instance was obtained as the distillation residue.

Example 3

The phenolic bodies or cresols employed in this example were obtained by acidifying the alkali employed in washing a kerosene fraction secured by distillation of crude petroleum. Afterwards the crude cresols were fractionated to remove a large proportion of the admixed sulphur compounds, hydrocarbons, etc. The boiling range of the product indicated it to be a mixture of propylated phenols.

30 parts of these cresols were dissolved in 100 parts of a refined cracked distillate (boiling at 54° to 150° C.), then 25 parts of diisopropyl sulphate, and while the solution was stirred vigorously there were added slowly and in small portions 50 parts of lead oxide. Agitation was continued for 8.5 hours at room temperature (27° to 28° C.). At the end of this period, all solid material was removed from the reaction mixture by filtration, and the filtrate was washed twice with 50 parts of 10% aqueous caustic soda and then allowed to stand in contact with 50 parts of 20% aqueous caustic solution for 16 hours.

To the alkali washed product were added 50 parts of 20% caustic solution and the mixture distilled with steam. The alkali was intended to prevent distillation of unreacted cresols and to effect hydrolysis of any diisopropyl sulphate which was present. The distillate consisted of an aqueous layer and an oil layer, and the latter was separated and subjected to fractional distillation at atmospheric pressure to remove the solvent or that portion boiling up to 150° C. Thereafter distillation was continued under reduced pressure and two fractions of isopropyl cresol ethers secured, one boiling at 65° to 90° C. at 435 to 510 mm. pressure and the other at 60° to 140° C. at 160 mm. pressure. These ethers were insoluble in 10% aqueous caustic soda solution.

The distillation residue, or alkylated cresols, were found to be soluble in 10% aqueous caustic soda and could be regenerated or recovered therefrom on the addition of hydrochloric or other mineral acid.

The ratio of the yield of the ethers to that of alkylated cresols in this particular instance was approximately 5:3.

Example 4

100 parts of a refined cracked distillate (boiling at 54° to 150° C.) were admixed with 138 parts of phenol (carbolic acid). To this mixture were added 60 parts of zinc oxide and 134 parts of diisopropyl sulphate, and the whole agitated for 6.5 hours at room temperature (27°–28° C.). The reaction mixture was filtered to remove undissolved material and the filtrate washed twice with 50 parts of 15% aqueous caustic soda and then steam distilled in the presence of a like quantity of the alkaline liquid.

The hydrocarbon layer in the distillate was separated, washed with dilute aqueous caustic soda, then with water, and afterwards dried and fractionally distilled. The fraction containing phenyl isopropyl ether was distilled at 170° to 182° C. at atmospheric pressure. Another fraction containing alkylated phenols was distilled at 120° to 147° C. at 75 to 100 mm. pressure.

That this latter fraction contained mainly diisopropyl phenol was indicated in the following manner. The liquid was treated with 10% aqueous sodium hydroxide and any insoluble material withdrawn. Dilute hydrochloric acid was added to the alkaline solution and the phenols which separated were removed, washed with water and dried. A weighed sample of the phenolic bodies was dissolved in ethyl alcohol and the solution titrated with standardized sodium hydroxide solution. From the weight of the sample and the volume of standard alkali required for neutralization, it was calculated that the average molecular weight of the phenolic bodies was 175. The molecular weight of diisopropyl phenol is 178.

Example 5

To 250 parts of benzol were added 150 parts of α-naphthol, 105 parts of mercuric oxide and 100 parts of diisopropyl sulphate and the mixture agitated at room temperature (27° to 30° C.) for 6.5 hours. At the end of this period the mixture was filtered and the filtrate or benzol solution washed several times with 40% by volume of 10% aqueous sodium hydroxide. The benzol solution, admixed with 100 parts of 10% aqueous caustic soda, was subjected to steam distillation to eliminate benzol.

The distillation residue was extracted with ether (to parts) and the etherial solution removed and kept surrounded with solid carbon dioxide for 1 hour. During this time a small quantity of solid, crystalline material separated and this was removed by filtration. The yield of material could be increased by concentrating the ether solution and again cooling with solid carbon dioxide.

The solid product became liquid when it warmed to room temperature and when the liquid was cooled to 0° C., it became quite hard but did not completely solidify. The liquid product possessed a mild cinnamon-like odor.

Example 6

As illustrations of the application of phenyl ethers as perfumes or perfume bases in soaps, the following samples, having the compositions indicated, were prepared, wrapped in clear, transparent cellophane and stored in a place where they were exposed to light. The soap in this instance was a commercial product substantially free of excess alkali, whose color to the eye appeared to be white and which possessed a very low content of water. In each case the substantially dry soap was ground to a fine powder, the liquid ingredients incorporated into the latter by grinding, and the resulting composition then pressed into the form of small cakes.

|   |   | Parts |
|---|---|---|
| (1) | Soap | 20 |
|   | Glycerol | 0.5 |
| (2) | Soap | 20 |
|   | Glycerol | 0.5 |
|   | Phenyl isopropyl ether | 0.05 |
| (3) | Soap | 20 |
|   | Water | 0.5 |
|   | Phenyl isopropyl ether | 0.15 |
| (4) | Soap | 20 |
|   | Glycerol | 0.5 |
|   | Phenyl isopropyl ether | 0.25 |

At the end of two weeks' exposure, all samples were still white in color and those containing the ether still retained the pleasant odor of that compound. At the end of six weeks, however, the etherial odor had disappeared entirely and the compositions which initially contained the ether had begun to discolor.

Example 7

Soap compositions were prepared, as described in Example 6, but this time they were wrapped with metal foil and stored out of contact with light. Under these conditions the odor of phenyl isopropyl ether was persistent even after six weeks' storage, although the samples had begun to discolor somewhat. In this instance also, no change in color of the composition containing the ether was noted at the end of two weeks' storage.

From the foregoing it will be seen that this invention comprises treating phenolic bodies with alkyl halides or dialkyl sulphates in the presence of a heavy metal oxide to produce aromatic-aliphatic ethers. It also includes effecting this reaction in the presence of an inert liquid medium and without the application of external heating. By the term inert liquid is meant a liquid substance which will not interact to any substantial degree with the reactants (phenolic bodies, metallic oxide and alkyl halide or dialkyl sulphate) during the preparation or synthesis of aromatic-aliphatic ethers as herein described or in any other manner undesirably affect the course of the reaction.

As previously mentioned, the alkylating or etherizing agents are alkyl halides or dialkyl sulphates. Not only those agents having straight-chain radicals or groups may be employed, such as ethyl chloride or bromide and diethyl sulphate, but also those containing branch-chain radicals or groups, as for example, tertiary butyl chloride or diisopropyl sulphate.

This invention not only comprises the preparation of aromatic-aliphatic ethers, but it also includes the preparation of alkylated phenols which are obtained as a by-product in the synthesis or isolation of the ethers.

I claim:

1. The process which comprises treating without the application of external heat a phenol with a heavy metal oxide selected from the group consisting of lead oxide, zinc oxide and mercuric oxide and with an alkylating agent selected from the group consisting of alkyl halides and dialkyl sulphates whereby an aromatic-aliphatic ether is obtained.

2. The process according to claim 1 in which the heavy metal oxide is lead oxide and the alkylating agent is diisopropyl sulphate.

3. The process according to claim 1 in which the phenol is that derived by the alkali treatment of a petroleum distillate.

4. The process which comprises treating without the application of external heat a phenol with an oxide of a heavy metal selected from the group consisting of lead, zinc and mercury, and with an alkylating agent selected from the group consisting of alkyl halides and dialkyl sulphates, and subjecting the product to a distillation operation, whereby an aromatic-aliphatic ether and an alkylated phenolic body are obtained.

5. The process which comprises treating without the application of external heat a phenol dissolved in an inert solvent with an oxide of a heavy metal selected from the group consisting of lead, zinc and mercury and with an alkylating agent selected from the group consisting of alkyl halides and dialkyl sulphates, whereby an aromatic-aliphatic ether is obtained.

6. The process which comprises treating without the application of external heat a phenol dissolved in a saturated liquid hydrocarbon with an oxide of a heavy metal selected from the group consisting of lead, zinc and mercury and an alkylating agent selected from the group consisting of alkyl halides and dialkyl sulphates, filtering to remove all insoluble material, washing the solution with a dilute alkaline solution and distilling to recover aromatic-aliphatic ethers.

7. The process according to claim 6 in which the solvent is benzol.

8. The process according to claim 6 in which the solvent is gasoline boiling between 70° and 130° C.

9. The process which comprises agitating a mixture of phenol, diisopropyl sulphate and isopropyl alcohol and lead oxide for at least 5 hours at a temperature of about 18° to 20° C., filtering the mixture to remove insoluble material, adding aqueous caustic soda and distilling to recover isopropyl phenol ether boiling between 175° and 178° C.

CARLETON ELLIS.